United States Patent [19]

Weseloh

[11] 4,363,247
[45] Dec. 14, 1982

[54] TRANSMISSION WITH A FIRST-STAGE HYDROSTATIC MODE AND TWO HYDROMECHANICAL STAGES

[75] Inventor: William E. Weseloh, San Diego, Calif.

[73] Assignee: Orshansky Transmission Corporation, New York, N.Y.

[21] Appl. No.: 95,304

[22] Filed: Nov. 19, 1979

[51] Int. Cl.³ .................... F16H 47/04; F16H 3/44
[52] U.S. Cl. ........................... 74/687; 74/677; 74/789; 74/740
[58] Field of Search .............. 74/687, 677, 740, 789, 74/790, 791

[56] References Cited

U.S. PATENT DOCUMENTS

| | | | |
|---|---|---|---|
| 2,884,809 | 5/1959 | Moore | 74/677 |
| 2,889,715 | 6/1959 | De Lorean | 74/677 |
| 3,314,307 | 4/1967 | Egbert | 74/688 |
| 3,772,939 | 11/1973 | Hause | 74/677 |
| 4,134,311 | 1/1979 | Orshansky, Jr. et al. | 74/687 |
| 4,168,637 | 9/1979 | Orshansky, Jr. et al. | 74/687 |
| 4,196,644 | 4/1980 | Orshansky, Jr. et al. | 74/687 |
| 4,261,226 | 4/1981 | Orshansky, Jr. et al. | 74/789 X |

FOREIGN PATENT DOCUMENTS 566609 9/1957 Italy ....................... 74/687
2037915 7/1980 United Kingdom ......... 74/687

Primary Examiner—Leslie Braun
Assistant Examiner—Lawrence J. Gotts
Attorney, Agent, or Firm—Owen, Wickersham & Erickson

[57] ABSTRACT

A power transmission having a single Ravigneau-type planetary assembly, having a single carrier with two sets of planet gears, two sun gears, and one ring gear. A first sun gear is connected by a first set of planet gears to the ring gear; the ring gear itself is directly and rigidly connected to an output shaft. A speed-varying module is connected in driving relation to the input shaft and in driving relationship to the first sun gear. The speed varying means may comprise a pair of hydraulic units hydraulically interconnected so that one serves as a pump while the other serves as a motor and vice versa, one of the units having a variable stroke and being connected in driving relation to the input shaft, the other unit, which may have a fixed stroke, being connected in driving relation to the first sun gear. The input shaft is also connectable by a first clutch to the carrier and by a second clutch to the second sun gear. A brake grounds the carrier in the first range and in reverse and causes drive to be delivered to the output through the ring gear in a hydrostatic mode.

7 Claims, 3 Drawing Figures

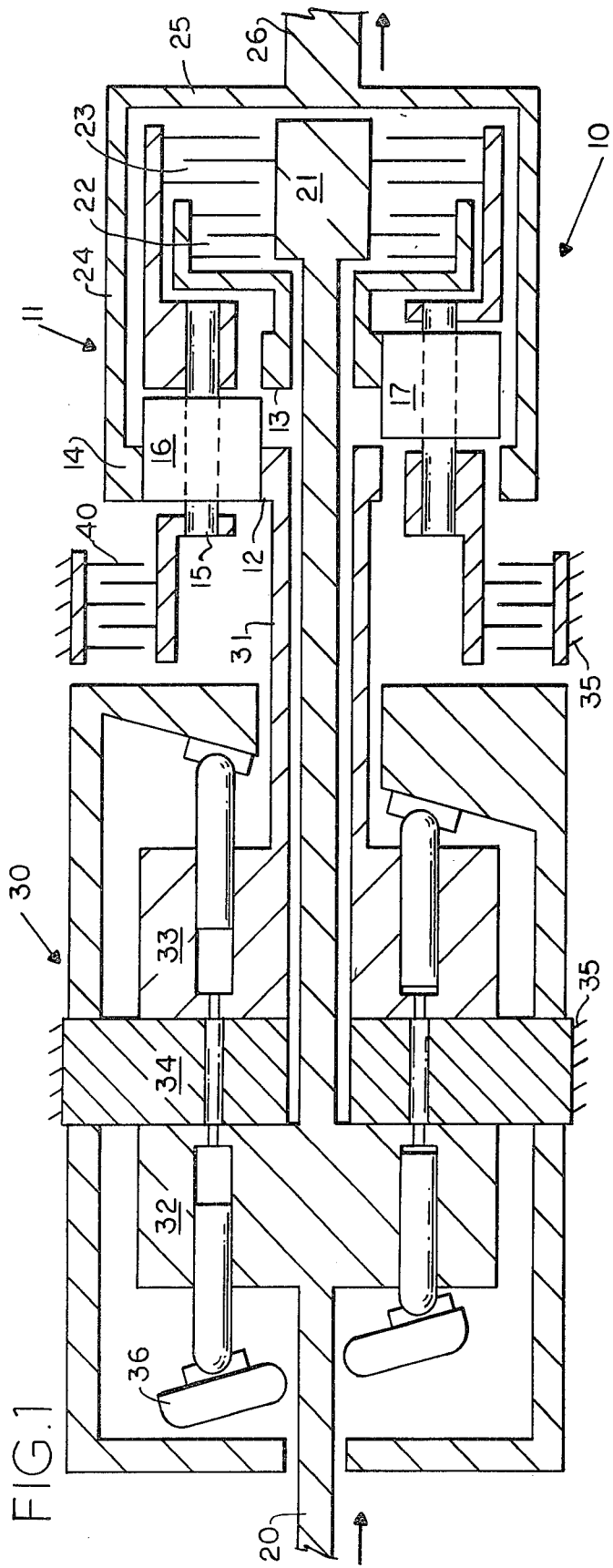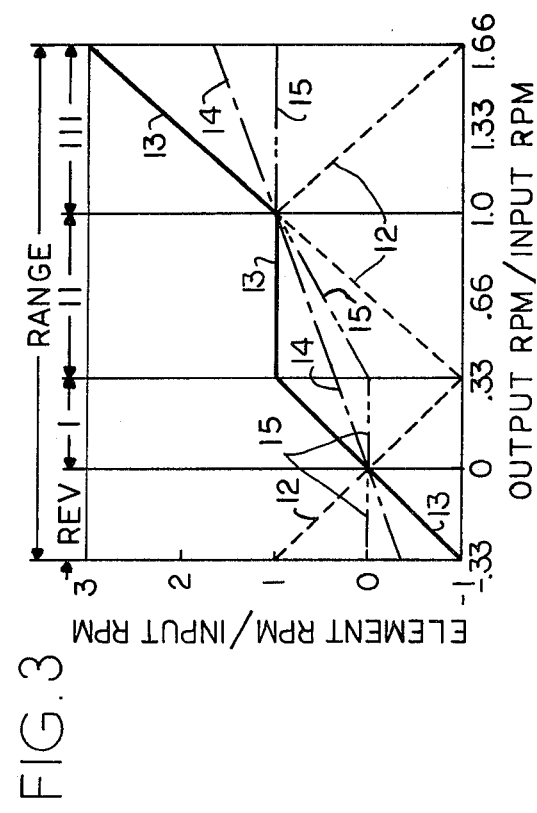

TRANSMISSION WITH A FIRST-STAGE HYDROSTATIC MODE AND TWO HYDROMECHANICAL STAGES

BACKGROUND OF THE INVENTION

This invention relates to an improved transmission. It may be considered an improvement on the hydromechanical transmission described in U.S. Pat. No. 4,168,637 which issued Sept. 25, 1979.

The transmission of U.S. Pat. No. 4,168,637 and the transmission of the present invention each provides a hydromechanical infinitely variable transmission. Each provides for improved utilization of vehicle engine power by enabling the engine to operate within a narrow speed range which has been optimized for minimum emissions, maximum fuel economy and maximum power, regardless of vehicle operating conditions. There are many identical features.

In U.S. Pat. No. 4,168,637 there were two sets of planetary assemblies, each one of which had at least one sun gear, ring gear, carrier, and planet gears. In the present invention these two sets of planetary assemblies are replaced by a single Ravigneau-type planetary assembly.

The present invention possesses all of the advantages of our U.S. Pat. No. 4,168,637 and also possesses the further advantages of simplicity, lower manufacturing cost, reduced size, and reduced weight. These advantages are a result of the current invention having just one ring gear, just one planet carrier, and simplified clutch oil feeds.

Another very important cost advantage accrues to the form of the invention which has a particular gearing ratio. For the particular gearing ratio which produces equal hydraulic horsepower on each side of the shift, the ring-to-sun ratio is 3:1 for both sun gears. This means that the two sun gears as well as the first planet gear are the same diameter and have the same number of teeth. Furthermore the second planet gear may also have that same diameter and have the same number of teeth. If these are spur gears (not helical), then all of the gears in the transmission are identical except, of course, for the ring gear. If the gears are helical (which is standard practice for passenger cars) then the first planet and second sun are identical. And, also, the first sun and the second planet may be identical. The tooling cost advantage from all of this is readily apparent.

In addition, all of the advantages of low hydraulic horsepower and high efficiency of U.S. Pat. No. 4,168,637 are also present, as is the start up in forward and reverse.

SUMMARY OF THE INVENTION

The power transmission of the invention includes, in combination with input means and output means, a single Ravigneau-type planetary assembly, with a single carrier carrying two sets of planet gears, two sun gears, and a single ring gear. The first sun gear meshes with the first set of planet gears, which also mesh with the ring gear. The second set of planet gears meshes with the first set of planet gears and with the second sun gear. A speed-varying module is connected at one end to the input and is connected at the opposite end to the first sun gear. The speed-varying module may comprise a pair of hydraulic units hydraulically interconnected, so that one serves as a pump while the other serves as a a motor and vice versa, one of the hydraulic units being connected in driving relation to the input, and the other being connected in driving relation to the first sun gear of the planetary assembly.

The input means may be clutched by a first clutch to drive the carrier or may be clutched by a second clutch to the second sun gear. The output is connected directly and rigidly to the ring gear.

A brake may be used for grounding the carrier and causing the drive from the speed-varying module through the first sun gear to be delivered to the output means through the ring gear. The brake is a low-range clutching means used for both reverse and for starting in a Range I; the speed-varying module can be run in reverse, forward, or zero drive, and at varying speeds in forward or reverse, such as by respective strokings of a controlling wobble-plate. In both Range I and in the Reverse mode, power flows from the speed-varying module to the first sun gear of the planetary assembly. When the speed-varying module comprises a pair of hydraulic units, the unit connected to the input functions as a pump in Range I and in Reverse, while the unit connected to the first sun gear functions as a motor at that time.

The speed of the second sun gear increases rapidly during forward transmission drive in Range I and at the end of that range becomes equal to the speed of the input shaft. When the speed of the second sun gear becomes equal to the speed of the input shaft, then it is clutched to the input shaft to begin Range II, the brake being released immediately thereafter. During Range II the brake is disengaged and simply allowed to slip, producing very low loss, while the speed-varying unit provides for speed increase in Range II.

During Range II, the speeds of all the other planetary assembly elements (first sun gear, ring gear, and carrier) approach the speed of the second sun gear and of the input shaft. When all these elements reach the speed of the input shaft, the high range clutch is engaged, connecting the input shaft to the carrier and putting the transmission synchronously into high range, Range III, and the Range II clutch is released immediately thereafter. In both hydromechanical ranges, the power flow through the speed-varying module may be in either direction depending on the particular mode of operation. In hydraulic embodiments, when the hydraulic unit attached to the input functions as a pump, the hydraulic unit attached to the first sun gear functions as a motor; and when the unit attached to the input functions as a motor, the unit attached to the first sun gear functions as a pump. Both units sometimes function as a pump and sometimes function as a motor.

The shifts between ranges in this new transmission occur at synchronized speeds, without interruption of power flow on either the upshift or the downshift. For this purpose a desired gear ratio is provided.

The starting and reverse ranges are hydrostatic and, in most cases, operate at less than maximum power; they may approach a maximum constant torque, since maximum output torque may be limited by either maximum pressure or traction. The hydromechanical or working ranges, Ranges II and III, may operate at full and constant horsepower.

BRIEF DESCRIPTION OF THE DRAWINGS

In the drawings:

FIG. 1 is a diagrammatic view in elevation and in section of a transmission illustrating the principles of this invention;

FIG. 2 is a brake and clutch engagement and range diagram for the transmission of FIG. 1; and FIG. 3 is a speed lines diagram for the transmission of FIG. 1 with the ratio of output speeds to input speeds, in r.p.m., being plotted against the ratio of the speeds of the planetary members to the input speeds in r.p.m. The three forward ranges and the reverse range are identified.

DESCRIPTION OF A PREFERRED EMBODIMENT

A transmission 10 of this invention has a Ravigneau-type planetary assembly 11 having two sun gears 12 and 13, a single ring gear 14, and a single carrier 15 with two sets of planet gears 16 and 17 intermeshed with each other.

An input shaft 20, preferably concentric with the planetary assembly 11, has a portion 21 which may be connected by a first clutch 22 to the second sun gear 13 or may be connected by a second clutch 23 to the carrier 15. The ring gear 14 is connected directly and rigidly by a drum 24 to a flange 25 on an output shaft 26.

The input shaft 20 is also drivably connected to a speed-varying hydraulic module 30, the other end of which is connected to a hollow shaft 31 that carries the first sun gear 12. The module 30 preferably comprises a variable-displacement hydraulic unit 32 in driving relationship with a fixed-displacement hydraulic unit 33, with hydraulic fluid transmitted between them through a stationary port plate block 34, attached to a frame 35. The variable-displacement unit 32 has a wobble plate 36.

A brake 40, when engaged, holds the carrier 15 stationary in the hydrostatic ranges of both forward Range I and reverse, while the first clutch 22 is used in hydromechanical Range II, and the second clutch 23 is used in hydromechanical Range III.

In this embodiment, the input shaft 20, output shaft 26, the hydraulic units 32 and 33, and the planetary assembly 11, are all coaxial.

When the brake 40 is engaged, the first planetary gears 16 rotate but are arrested in their planetary motion. This makes a reversing drive between the first sun gear 12 and the ring gear 14, causing a rotation of the ring gear 14 which is reversed in rotation to that of the first sun gear 12. The low-range brake 40 is engaged for starting (and also for reverse), while the clutches 22 and 23 are at that time disengaged, so that the driving connection between the hydraulic module 30 and the first sun gear 12 causes the ring gear 14 to run in a reverse direction and at a reduced speed with respect to the first sun gear 12.

In this region the drive is purely hydrostatic, and when the variable-displacement hydraulic unit 32 is on zero stroke, the vehicle is at a standstill, since no drive is then coming through the speed-varying module 30 and since the brake 40 is engaged.

If the wobble plate 36 of the variable-displacement unit 32 is stroked in one direction, the transmission 10 is in "reverse," and if the wobble plate 36 is stroked in the opposite direction, the transmission 10 is in "forward". When the wobble plate 36 is stroked in "forward", the first sun gear 12 traverses in speed from zero to the negative speed, as shown in Range I in FIG. 3, and with the carrier 15 grounded by the brake 40, the speed of the ring gear 14 increases upwardly from zero, as shown in Range I in FIG. 3. In all cases of normal power flow (i.e., from the input shaft 20 to the output shaft 26) during Range I and in Reverse, the hydraulic unit 32 functions as a pump, while the hydraulic unit 33 functions as a motor.

During Range I, the output shaft 26 is being driven by the drum 24 and flange 25 from the ring gear 14, so that the output shaft 26 begins to turn and gradually increases in speed. At the same time, the speed of the second sun gear 13, being driven by the carrier 15 through the second set of planet gears 17, increases more rapidly than do the speeds of the output shaft 26 and the carrier 15. When the forward speed of the second sun gear 13 becomes equal to the forward speed of the input shaft 20, the first clutch 22 is engaged, and the transmission goes into Range II, the brake 40 being released or disengaged immediately thereafter. This begins the first hydromechanical range.

The drive continues from the ring gear 14 to the output shaft 26. The low-range brake 40 simply slips, producing some loss, but such losses are usually very low. The ring gear 14 continues to be varied in speed by the action of the hydraulic units 32 and 33 on the first sun gear 12. At the beginning of Range II immediately after the transition from Range I, the first sun gear 12 continues to be driven in the opposite direction from the input shaft 20 and output shaft 26, the gear 12 being driven from the planetary gears 16. Thus, the first sun gear 12 now drives the hydraulic unit 33 and thereby causes the hydraulic unit 33 to function as a pump and the hydraulic unit 32 to function as a motor. The way in which this changes comes about is as follows: during Range II the wobble plate 36 of the hydraulic unit 32 is stroked from its position at the transition from Range I to Range II through a position of zero displacement and then beyond that to a position approximately equal in magnitude to that of the Range I to Range II transition but opposite in sense. As a result, the first sun gear 12 changes in speed (see FIG. 3) from approximately negative engine speed down to zero speed and then to a speed equal to that of the engine. Hence, the function of the hydraulic unit 33 changes from that of a pump to that of a motor, while the function of the hydraulic unit 32 simultaneously changes from that of a motor to that of a pump.

When the end of Range II is reached, the speed of the ring gear 14, as well as the speed of the first sun gear 12 and of the carrier 15 has reached a speed to equal the speed of the input shaft 20 and therefore the speed of the second sun gear 13; it is therefore possible to engage the high-range clutch 23, which puts the transmission into the high Range III, immediately thereafter releasing the clutch 22. At the beginning of Range III, immediately after the transition from Range II to Range III, the first sun gear 12 and the hydraulic unit 33 continue to be driven at engine speed; however, the torque on these components is opposite in sense to that in Range II; therefore, the hydraulic unit 33 again functions as a pump, while the hydraulic unit 32 functions as a motor and adds power to the input shaft 20.

During range III the wobble plate 36 of the hydraulic unit 32 is stroked from its position at the Range II to Range III transition back through zero displacement and on towards a position approximately equal to that at the Range I to Range II transition. As a result, the first sun gear 12 and the hydraulic unit 33 decrease in speed from a value equal to the engine speed down to zero speed and then increase in speed in the negative direction to a speed equal in magnitude to the engine speed but opposite in direction. Hence, the function of the hydraulic unit changes from that of a pump through a zero point to that of a motor. Simultaneously, the function of the hydraulic unit 32 changes from that of a motor to that of a pump.

The planetary assembly 11 of FIG. 1 serves a multiplicity of functions. It carries load in all three ranges. In the hydrostatic Range I, the planetary assembly 11 is a simple power-transmitting gear train. In Range II, the planetary assembly 11 becomes a power-splitting planetary assembly. In Range III the planetary assembly 11 splits the power between input, output, and reaction. In Ranges II and III its sun gear 12 is the reaction gear.

Gear Proportioning:

As stated in U.S. Pat. No. 4,168,637, for any hydromechanical transmission having a hydrostatic startup range and two simple hydromechanical ranges, it is possible to proportion the gears so that the hydraulic horsepower on both sides of the shift points is the same.

The advantage of this feature is that efficiency of the transmission, likewise, will be nearly equal on each side of the shift points. A further advantage of this feature is that controls are greatly simplified, due to the inherent continuous efficiency profile, which lacks the discontinuities which are otherwise typical of hydromechanical transmission.

The hydraulic power relationships in a simple hydromechanical transmission are as follows:

$R_{NR}$ = output speed to input speed ratio in nonrecirculative range $R_R$ = output speed to input speed ratio in recirculative range $R_O$ = output speed to input speed ratio at zero reaction speed (zero hydraulic power point)

$X_{NR}$ = speed ratio of $R_{NR}/R_O$ $X_R$ = speed ratio of $R_O/R_R$ $P_{NR}$ = percent hydraulic power at point $$P_{NR} = \frac{X_{NR} - 1}{X_{NR}} \times 100$$

$P_R$ = percent hydraulic power at point
$P_R = (X_R - 1) \times 100$

By definition, the hydraulic power in the hydrostatic range is 100% of input power. The beginning of the first hydromechanical or power-split range is a recirculative mode and, therefore, $P_R$ must equal $(X-1)\times 100$. $(X_R-1)\times 100$ must equal 100%, $X_R$, therefore equals 2, which is to say that if the gear proportions are such that the ratio at the zero hydraulic power point is two times the speed ratio at the beginning of the range, then the hydraulic power will be 100% of the input.

At the end of the first hydromechanical range, the hydraulic power would typically be 33%. Therefore, for the second hydromechanical or power-split range, $(X_R-1)\times 100$ must equal 33 and $X_R$ must equal 1.33, which is to say that if the output speed ratio at the zero hydraulic power point is 1.33 times the output speed ratio at the beginning of the second hydromechanical range, then the hydraulic horsepower at this point will equal 33% of the input. Of course, the above relationships apply to any subsequent ranges as well. This hydraulic power matching can be accomplished between any two ranges in any simple hydromechanical transmission having any number of ranges. Also, it is possible to design a simple hydromechanical transmission having any number of ranges such that the hydraulic power on both sides of each shift is the same. This is accomplished by maintaining the speed relationships shown above. However, as a practical matter, hydraulic power matching is best suited to a three-range transmission, the first range of which is hydrostatic. Typical component speed relationships accomplishing the above-described transitions are shown in FIG. 3.

One such set of values that meets with the discussed conditions is obtained by having the ratios of the first sun gear to the ring gear be 1:3 and by having the ratio of the second sun gear to the ring gear also be 1:3.

Typical gear tooth numbers are as follows:

|  | Teeth |
| --- | --- |
| First sun gear 12 | 24 |
| First planet gears 16 | 24 |
| Ring gear 14 | 72 |
| Second sun gear 13 | 24 |
| Second planet gears 17 | 24 |

Advantages of the Invention

The invention possesses all of the advantages of our U.S. Pat. No. 4,168,637 and also possesses the further advantages of simplicity, lower manufacturing cost, reduced size, and reduced weight. These advantages are a result of the current invention having just one ring gear 14, just one planet carrier 15, and simplified clutch oil feeds.

The transmission, as noted, is extremely simple in construction. In a single case it incorporates the planetary assemblies, two clutches and one brake. Moreover, the ring-to-sun ratios as the two single planetary assemblies can be of quite conventional proportions, so that sound construction can be obtained from minimum material. Simplicity of construction is also enhanced by the fact that the brake is attached to a member on the outside of the planetary assembly. Also, the oil feeds to the two clutches are simple.

Another very important cost advantage accrues to the form of the invention which has the particular gearing ratio just described. For the particular gearing ratio which produces equal hydraulic horsepower on each side of the shift, the ring-to-sun ratio is 3:1 for both sun gears 12 and 13. This means that the two sun gears 12 and 13 as well as each of the first planet gears 16 are the same diameter and have the same number of teeth. Furthermore each of the second planet gears 17 may also have that same diameter and have the same number of teeth. If these are spur gears (not helical), then all of the gears in the transmission are identical except, of course, for the ring gear 14. If the gears are helical (which is standard practice for passenger cars) then the first planet gears 16 and the second sun gear 13 are identical. And, also, the first sun gear 12 and the second planet gears 17 may be identical. The tooling cost advantages are thus apparent.

The construction also has the advantage of low planet gear speeds, a feature that was not possible in many hydromechanical transmission designs. The highest relative planet gear speeds occur at maximum overdrive ratio in high range and at the end of Range I, and in both cases the planet speed is approximately equal to the input speed.

To those skilled in the art to which this invention relates many changes in construction and widely differing embodiments and applications of the invention will suggest themselves without departing from the spirit and scope of the invention. The disclosure and the description herein are purely illustrative and are not intended to be in any sense limiting.

What is claimed is:

1. A three-range power transmission with two shift points, comprising:
a stationary frame,
input means,
output means,
a single Ravigneau-type planetary assembly having a single ring gear and a single carrier with first and second sets of planet gears intermeshed with each other, said first set of planet gears being in mesh with said ring gear, first and second sun gears, said first set of planet gears engaging with said first sun gear and said second set of planet gears engaging with said second sun gear, said ring gear being directly connected to said output means,
a reversible speed-varying module at all times directly and rigidly connected on one side to said input means and, on its other side, connected at all times directly and rigidly to said first sun gear, thereby connecting said input means to said first sun gear at all times,
braking means for releasably connecting said planetary assembly to said frame in a first, forward starting range and in a reverse range, whereby when said braking means is engaged, said output means is driven from said input means through said speed-varying module, said first sun gear and said first set of planet gears,
first releasable clutching means for synchronously connecting, at a first shift point, said second sun gear of said planetary assembly directly to said input means, in a second, forward intermediate range, with release of said braking means after engagement of said first clutching means,
second releasable clutching means synchronously connecting, at a second shift point, said carrier to said input means in a third forward high-speed range, with release of said first clutching means after engagement of said second clutching means.

2. The power transmission of claim 1 wherein said speed-varying module comprises:
a pair of hydraulic pump-motor units hydraulically interconnected so that one serves as a pump while the other serves as a motor and vice versa, and
a first said hydraulic pump-motor unit connected in direct, rigid driving relation to said input means and a second said hydraulic pump-motor unit being connected directly and rigidly to said first sun gear,
whereby said first range is hydrostatic and said second and third ranges are hydromechanical.

3. A power transmission according to claim 2 wherein said first hydraulic pump-motor unit is variable in stroke and runs during operation at constant speed relative to the input while said second pump-motor unit is fixed in stroke and variable in speed.

4. The transmission of claim 1 wherein said input means, output means, and speed varying module are all coaxial.

5. The transmission of claim 1 wherein said gears of said two planetary assemblies are so proportioned that the hydraulic horsepower on both sides of the shift points is the same.

6. The power transmission of claim 1 wherein the gear ratios are as follows, so as to achieve equal hydraulic horsepower and nearly equal transmission efficiencies on both sides of each shift point:
Ratios to each other within the planetary assembly:
first sun gear—1
first planet gears—1
ring gear—3
second sun gear—1
second planet gears—1.

7. The power transmission of claim 1 wherein the respective gears bear the following number of teeth:
first sun gear—24
first planet gears—24
ring gear—72
second sun gear—24
second planet gears 24.

* * * * *